United States Patent
Koivunen

[15] 3,659,480
[45] May 2, 1972

[54] VEHCILE POWER TRAIN

[72] Inventor: Erkki A. Koivunen, Livonia, Mich.
[73] Assignee: General Motors Corporation, Detroit, Mich.
[22] Filed: July 6, 1970
[21] Appl. No.: 52,544

[52] U.S. Cl..................................74/695, 74/710.5, 74/730
[51] Int. Cl..................F16h 37/08, F16h 47/08, F16h 57/04
[58] Field of Search................74/694, 695, 700, 701, 710.5, 74/720.5, 730; 60/DIG. 5

[56] References Cited

UNITED STATES PATENTS

| 2,805,743 | 9/1957 | Keese | 74/700 X |
|---|---|---|---|
| 2,457,692 | 12/1948 | La Brie | 60/DIG. 5 |
| 2,014,383 | 9/1935 | Knox et al. | 74/700 X |
| 2,340,494 | 2/1944 | Smirl | 60/DIG. 5 |
| 2,595,854 | 5/1952 | Howard | 74/701 X |
| 3,007,352 | 11/1961 | Biedess | 74/720.5 X |
| 3,090,256 | 5/1963 | Hause | 74/695 X |
| 3,393,581 | 7/1968 | Stockton | 74/710.5 |

Primary Examiner—Carlton R. Croyle
Assistant Examiner—Thomas C. Perry
Attorney—W. E. Finken, A. M. Heiter and R. L. Phillips

[57] ABSTRACT

A vehicle power train having an engine, a transmission including a torque converter driven by the engine, differential gearing connecting the transmission to the vehicle's drive axle shafts, a brake connected to brake the input to the differential gearing to brake the drive axle shafts and a fan driven by the input of the transmission circulating air to cool the brake, the torque converter and the engine.

3 Claims, 1 Drawing Figure

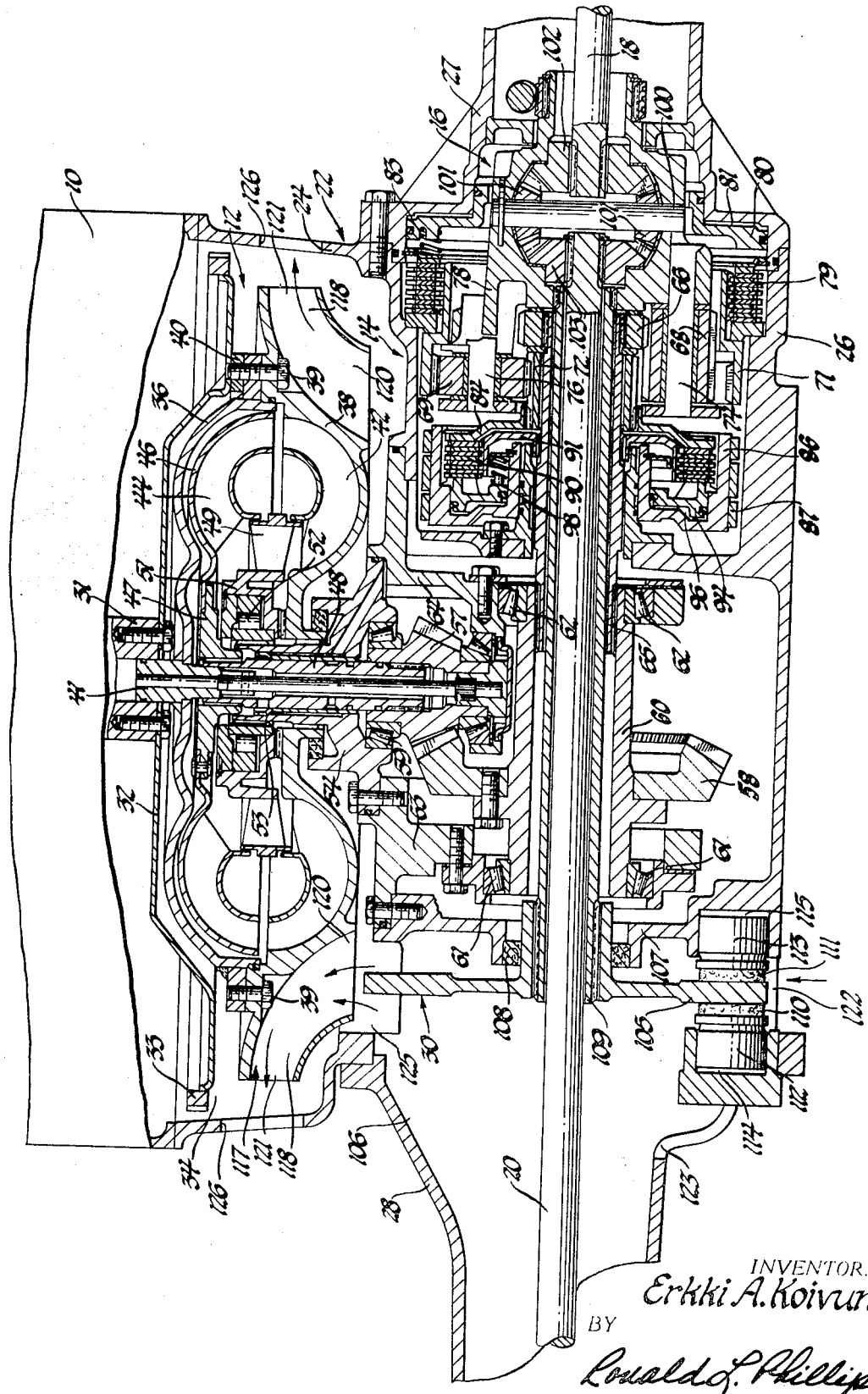

VEHCILE POWER TRAIN

This invention relates to vehicle power trains and more particularly to vehicle power trains with forced air cooling.

The vehicle power train according to the present invention comprises an engine that is connected to drive the drive axle shafts of a vehicle by a compact arrangement of a hydrodynamic torque converter, a multispeed planetary gear range unit and differential gearing. A single brake is incorporated in this arrangement and is connected to brake the input of the differential gearing to thus brake the axle shafts. The housing that houses the drive train is provided with an air inlet passage and an air outlet passage for a fan which rotates with the torque converter's rotary housing. The fan draws air into the drive train housing through the air inlet passage to cool both the brake and the torque converter and then discharges the air out of the air outlet passage to effect cooling of the engine.

An object of the present invention is to provide a new and improved vehicle power train arrangement having forced air cooling.

Another object is to provide in a vehicle power train a fan that operates to circulate air to cool a vehicle brake, torque converter and engine.

Another object is to provide in a vehicle power train a housing housing a transmission including a hydrodynamic torque converter, differential gearing and a vehicle brake connected to the input of the differential gearing wherein cooling of the brake, the converter and the engine is provide by a fan that is housed in the housing and is connected to be driven by the transmission input.

These and other objects of the present invention will be more apparent from the following description and drawing in which:

There is shown a plan view in section of the vehicle power train according to the present invention.

The vehicle power train according to the present invention is suitable for location in either the front or rear end of the vehicle as will become more apparent later and comprises an internal combustion engine 10 whose power is transmitted to drive the vehicle by a drive train generally comprising a transmission having a hydrodynamic torque converter 12 and a multispeed planetary gear range unit 14. The drive train further comprises differential gearing 16 with the output from the drive train being taken by a pair of drive axle shafts 18 and 20. The drive axles 18 and 20 are connected to drive the vehicle's driving wheels, not shown, which may be either the vehicle's forward or rear wheels. All of the drive train components are housed by a housing generally designated at 22 which comprises a converter housing 24 which is bolted to engine 10 and houses the torque converter 12, a range unit housing 26 which is bolted to converter housing 24 and houses the range unit 14 and axle housings 27 and 28 which are bolted to the opposite ends of range unit housing 26 and house the axle shafts 18 and 20, respectively. The axle housing 27 and the right end of range unit housing 26 also cooperate to house the differential gearing 16. The drive train housing 22 provides rigid support for the drive train components wherein the central axes of engine 10 and torque converter 12 are aligned and extend longitudinally of the vehicle and the central axes of range unit 14, differential gearing 16 and axle shafts 18 and 20 are aligned and extend transverse of the vehicle. A disc brake generally designated at 30 is also housed by the drive train housing 22 within range unit housing 26 with its central axis aligned with that of the axle shafts. Brake 30 is connected to the input of the differential gearing 16 to provide for braking of both the drive axles as described in more detail later.

Describing now the details of the power train components starting with the input, the engine's crankshaft 31 is bolted to a drive plate 32 on which is mounted the engine's starter gear 33. The plate 32 provides a flexible drive connection between the engine crankshaft 31 and the hydrodynamic torque converter 12 which is located in a chamber 34 provided by converter housing 24. The converter 12 comprises a rotary housing provided by a front cover 36 and a rear cover 38 which are secured together by bolts 39, certain ones of the bolts 39 having extended length to provide for bolting the rotary torque converter housing to lugs 40 which are fixed to drive plate 32. The front cover 36 also has a hub 41 fixed thereto which is piloted in the end of crankshaft 31. The rear cover member 38 carries pump blades 42 which pump fluid to turbine blades 44 that are carried by a shell 46. The turbine has a hub 47 that is splined to a converter output shaft 48 which extends into the range unit housing 26 through a side opening therein. Fluid exiting from turbine blades 44 is directed back to the pump blades 42 by stator blades 49 which are mounted on a hub 51. Hub 51 is mounted by a one-way brake 52 on a sleeve portion 53 of a bulkhead 54 which is bolted in the side opening to range unit housing 26. The hydrodynamic torque converter 12 is a three element converter of conventional design and provides torque multiplying operation from stall up to coupling speed and fluid coupling operation thereafter to drive the converter output shaft 48.

Drive from the converter 12 to the range unit 14 is provided by a right angle drive which is housed in range unit housing 26 and comprises a beveled pinion 57 which is splined to the converter output shaft 48 and meshes with a beveled ring gear 58 whose axis of rotation is at right angles to the rotational axis of the pinion 57. A bearing 59 rotatably supports pinion 57 and also converter output shaft 48 in the bulkhead 54. The ring gear 58 is bolted to a hub 60 which is rotatably supported at its ends by bearings 61 and 62 in bulkheads 63 and 64, respectively, provided in the interior of range unit housing 26. The rotary hub 60 is hollow along its length and is splined at the interior of its right end to a sleeve shaft 65 which is the input shaft to range unit 14.

In the multispeed planetary gear range unit 14, the sleeve shaft 65 is splined to a sun gear 66 which meshes with a long pinion 68 that in turn meshes with a short pinion 69 which is in mesh with both a ring gear 71 and another sun gear 72. The long pinion 68 and the short pinion 69 are rotatably mounted on shafts 74 and 76, respectively, and these shafts are supported by a carrier member 78 which also serves as the carrier for the differential gearing 16 as described in more detail later. The ring gear 71 may be selectively braked by a friction plate pack 79 in which alternate plates are splined to the ring gear 71 and the other plates are splined to range unit housing 26. Plates 79 are engaged by a fluid motor having an annular piston 80 which is mounted in a cylinder formed in range unit housing 26. Piston 80 is moved leftward on delivery of fluid pressure to a chamber 81 to engage plates 79 to brake the ring gear 71 and on exhaust of such pressure to release the brake, retraction springs 83 retract the piston 80 to its release position. When ring gear 71 is braked and with drive to sun gear 66 from torque converter 12, the carrier 78 is driven in a direction opposite that of shaft 65 to provide a reverse transmission drive. The sun gear 72 is connected by a hub 84 to a drum 86 which may be braked by a brake band 87 to provide a reduction drive between shaft 65 and carrier 78 to drive the latter member in the same direction as shaft 65 but at reduced speed to provide a low speed forward drive from the transmission. The brake band 87 may be operated by any suitable fluid motor. The drum 86 and thus sun gear 72 may also be clutched to shaft 65 by a friction plate pack 90 in which alternate plates are splined to drum 86 and the other plates are splined to a hub 91 that is splined to shaft 65. An annular piston 94 which is mounted in a cylinder formed in drum 86 is moved rightward on delivery of fluid pressure to a chamber 96 to engage the plates 90. With the sun gear 72 clutched to the shaft 65, the range unit's gearing is locked up to provide a 1:1 speed ratio drive to drive the carrier 78 in the same direction and at the same speed as shaft 65 to provide a high speed forward drive from the transmission. On exhaust of the pressure to release the clutch, retraction springs 98 operate to retract the piston 94 to its release position.

The differential gearing 16 comprises the carrier 78 which serves as the output from the transmission and also serves as the input to the differential. The carrier 78 supports a shaft 100 which is at right angles to the axis of rotation of carrier 78. Beveled spider gears 101 are rotatably mounted at spaced positions on shaft 100 and mesh at diametrically opposite sides with beveled side gears 102 and 103 whose axes of rotation are aligned and are at right angles to the aligned axes of the spider gears. The side gears 102 and 103 are splined to the axle shafts 18 and 20, respectively. The gearing of the differential being of a conventional type, operatively connects the two axle shafts while dividing the input force from the carrier 78 equally between them and permitting one axle shaft to revolve faster than the other.

Braking of the vehicle's driving wheels is provided by the single disc brake 30 which is connected to simultaneously brake the two axle shafts 18 and 20. This brake 30 comprises a brake disc 105 which is located in a chamber 106 that is formed by the axle housing 28 and the left end of the range unit housing 26. A bulkhead 107 in the left end of range unit housing 26 has a seal 108 contacting the hub of brake disc 105 to seal chamber 106 from the lubricated components of the drive train. The brake disc 105 is splined at its hub to a sleeve shaft 109 through which axle shaft 20 extends. Sleeve shaft 109 extends through rotary hub 60 and sleeve shaft 65 and is splined at its right end to the carrier 78. Thus, when brake disc 105 is braked, equal braking forces are applied to the axle shafts 18 and 20 through the input to the differential gearing to brake the vehicle's driving wheels. The disc brake 30 is braked by brake pads 110 and 111 which engage opposite sides of the brake disc 105. The pads 110 and 111 are carried on brake pistons 112 and 113, respectively, which are mounted in cylinders formed in range unit housing 26. The pistons 112 and 113 are urged in opposite directions to force the pads against the brake disc on delivery of fluid pressure to chambers 114 and 115, respectively.

Cooling of the disc brake 30, the hydrodynamic torque converter portion of the transmission and also the engine 10 is provided by forced air circulation which is effected by a centrifugal fan 117 driven by the transmission input. The fan 117 is located in chamber 34 of the converter housing 24 and comprises a plurality of arcuate shaped air passages 118 circumferentially spaced around and formed in the rear cover 38 of the torque converter 12. The passages 118 provide an arcuate flow direction for air with the passages having axially directed inlets 120 and radially directed outlets 121. Air flow through the drive train is provided by an aperture 122 in range unit housing 26 which is located radially outward of the disc brake 30 and between the disc brake's apply motors. The aperture 122 communicates the atmosphere with chamber 106 to provide an inlet passage for air to flow into chamber 106 and past the brake disc 105. An additional air inlet flow passage is provided by an aperture 123 in axle housing 28. An opening 125 between the range unit housing 26 and converter housing 24 connecting chambers 106 and 34 is located radially outward of brake disc 105 and is aligned with the fan inlets 120. Circumferentially spaced apertures 126 in the torque converter housing 24 communicate chamber 34 with the atmosphere and are aligned with the fan outlets 121 to provide air outlet passages for air flow out from the drive train housing where it then induces air circulation past engine 10.

On operation of the vehicle, the fan 117 thus rotates at transmission input speed which is engine speed and operates to draw air in through the air inlet passage 122 into chamber 106 where it passes the disc brake 30 and then through the opening 125 and chamber 34 into the fan inlets 120. The air taken into fan passages 118 is forced radially outward by centrifugal action through the fan outlets 121 and then the outlet passages 126, the above air circulation being shown by the arrows. Thus, the circulating air is directed to cool both the disc brake 30 and the torque converter 12 and is thereafter delivered to effect circulation in the engine compartment to cool the engine 10.

Thus, the vehicle power train according to the present invention provides for a very compact arrangement wherein a single brake is incorporated to provide for braking of the vehicle's driving wheels and a fan is also incorporated to circulate air to cool the brake, the torque converter and the engine. Since the fan is driven by the transmission input, it operates regardless of transmission drive selection.

The above described embodiment is illustrative of the invention which may be modified within the scope of the appended claims.

I claim:

1. In a vehicle power train the combination of an engine; a pair of axle shafts, drive train means for selectively drivingly connecting said engine to drive said axle shafts; housing means for housing said drive train means and having inlet air passage means and outlet air passage means; said drive train means comprising transmission means having an input connected to be driven about a central axis at right angles to said axle shafts by said engine and also having an output for providing a plurality of selective transmission drives between the input and output; said drive train means further comprising differential gearing means having an input connected to be driven by the output of said transmission means and also having a pair of outputs separately drivingly connected to said axle shafts for drivingly connecting said transmission means to said axle shafts while permitting one axle shaft to rotate faster than the other; selectively engageable brake means housed in said housing means and axially aligned with said axle shafts at a position spaced from said central axis for selectively braking the input of said differential gear means to brake said axle shafts; and fan means spaced from said central axis at a position corresponding substantially with the position of said brake means along said axle shaft axis, said fan means connected to be driven by the input of said transmission means for circulating air in through said air inlet passage means, across said brake means, and out through said outlet passage means to cool both said brake means and said engine.

2. In a vehicle power train the combination of an engine; a pair of axle shafts; drive train means for selectively drivingly connecting said engine to drive said axle shafts; housing means for housing said drive train means and having air inlet passage means and air outlet passage means; said drive train means comprising transmission means including hydrodynamic torque converter means intermediate said inlet and said outlet passage means; said transmission means having an input connected to be driven by said engine and also having an output and being operable to provide a plurality of selective transmission drives between the input and output; said drive train means further comprising differential gearing means having an input drivingly connected to the output of said transmission means and also having a pair of outputs separately drivingly connected to said axle shafts for drivingly connecting said transmission means to said axle shafts while permitting one axle shaft to rotate faster than the other; selectively engageable brake means housed in said housing means intermediate said inlet and said outlet passage means for selectively braking the input of said differential gear means to brake said axle shafts; and fan means housed in said housing means intermediate said inlet and said outlet passage means and connected to be driven by the input of said transmission means for drawing air into said housing means through said air inlet means to cool said brake means and also said hydrodynamic torque converter means and then discharging the air out of said housing means through said air outlet passage means to circulate air to cool said engine.

3. In a vehicle power train the combination of an engine; a pair of axially aligned axle shafts; drive train means for selectively drivingly connecting said engine to drive said axle shafts; housing means for housing said drive train means; said drive train means comprising transmission means including hydrodynamic torque converter means having a central axis at right angles to said axle shaft; said transmission means having an input connected to be driven by said engine and also having an output and being operable to provide a plurality of selective transmission drives between the input and output; said drive train means further comprising differential gearing means having an input drivingly connected to the output of said transmission means and also having a pair of outputs separately drivingly connected to said axle shafts for drivingly connecting said transmission means to said axle shafts while permitting one axle shaft to rotate faster than the other; selectively engageable brake means housed in said housing means in axial alignment with said axle shafts for selectively braking the input of said differential gear means to brake said axle shafts; said housing means including air inlet passage means and also including air outlet passage means; and fan means housed in said housing means and connected to be driven by the input of said transmission means for drawing air into said housing means through said air inlet passage means to cool said brake means and also said hydrodynamic torque converter means and then discharging the air out of said housing means through said air outlet passage means to circulate air to cool said engine.

* * * * *